United States Patent
Chen et al.

(10) Patent No.: US 12,496,321 B2
(45) Date of Patent: Dec. 16, 2025

(54) **ANTI-FATIGUE *LACTOBACILLUS* COMPOSITION AND METHOD OF PROMOTING ANTI-FATIGUE PERFORMANCE AFTER AEROBIC EXERCISE OF SUBJECT IN NEED THEREOF BY USING THE SAME**

(71) Applicant: Grape King Bio Ltd, Taoyuan (TW)

(72) Inventors: Chin-Chu Chen, Taoyuan (TW); Yen-Lien Chen, Taoyuan (TW); Shih-Wei Lin, Taoyuan (TW); You-Shan Tsai, Taoyuan (TW); Tzu-Chun Lin, Taoyuan (TW); Ci-Sian Wang, Taoyuan (TW); Yu-Hsin Hou, Taoyuan (TW); Yang-Tzu Shih, Taoyuan (TW); Ching-Wen Lin, Taoyuan (TW); Ya-Jyun Chen, Taoyuan (TW); Jia-Lin Jiang, Taoyuan (TW); Zi-He Wu, Taoyuan (TW); Yen-Po Chen, Taoyuan (TW)

(73) Assignee: Grape King Bio Ltd, Taoyuan (TW)

( * ) Notice: Subject to any disclaimer, the term of this patent is extended or adjusted under 35 U.S.C. 154(b) by 0 days.

(21) Appl. No.: 18/756,561

(22) Filed: Jun. 27, 2024

(65) Prior Publication Data
US 2024/0342229 A1 Oct. 17, 2024

Related U.S. Application Data

(62) Division of application No. 18/450,812, filed on Aug. 16, 2023, now abandoned.

(30) Foreign Application Priority Data

Apr. 12, 2023 (TW) ................. 112113702

(51) Int. Cl.
| | | |
|---|---|---|
| *A61K 35/747* | (2015.01) | |
| *A61K 9/00* | (2006.01) | |
| *A61K 9/19* | (2006.01) | |
| *A61K 35/00* | (2006.01) | |
| *C12N 1/20* | (2006.01) | |
| *C12R 1/225* | (2006.01) | |
| *C12R 1/24* | (2006.01) | |
| *C12R 1/25* | (2006.01) | |

(52) U.S. Cl.
CPC .......... *A61K 35/747* (2013.01); *A61K 9/0053* (2013.01); *A61K 9/19* (2013.01); *C12N 1/205* (2021.05); *A61K 2035/115* (2013.01); *C12R 2001/225* (2021.05); *C12R 2001/24* (2021.05); *C12R 2001/25* (2021.05)

(58) Field of Classification Search
CPC .. A61K 35/747; A61K 9/19; A61K 2035/115; C12N 1/205; C12R 2001/25; C12R 2001/225; C12R 2001/24
See application file for complete search history.

(56) References Cited

U.S. PATENT DOCUMENTS

| | | | |
|---|---|---|---|
| 2020/0008437 A1* | 1/2020 | Huang | ................. A23C 9/1203 |
| 2023/0372411 A1 | 11/2023 | Cutcliffe et al. | |

FOREIGN PATENT DOCUMENTS

| | | | |
|---|---|---|---|
| CN | 118028133 A | * | 5/2024 |
| JP | 2023072623 A | | 5/2023 |
| JP | 2024064924 A | | 5/2024 |
| TW | I583388 B | | 5/2017 |
| TW | 202203952 A | | 2/2022 |
| WO | 2012133533 A1 | | 10/2012 |
| WO | 2018074514 A1 | | 4/2018 |

OTHER PUBLICATIONS

Yi R, Feng M, Chen Q, Long X, Park KY, Zhao X. The Effect of Lactobacillus plantarum CQPC02 on Fatigue and Biochemical Oxidation Levels in a Mouse Model of Physical Exhaustion. Front Nutr. May 20, 2021;8:641544. doi: 10.3389/fnut.2021.641544. PMID: 34095185; PMCID: PMC8173150. (Year: 2021).*
Huang et al. Effect of Lactobacillus plantarum TWK10 on Exercise Physiological Adaptation, Performance, and Body Composition in Healthy Humans. Nutrients. Nov. 19, 2019;11(11):2836. doi: 10.3390/nu11112836. PMID: 31752370; PMCID: PMC6893516. (Year: 2019).*
Wen-Ching Huang, "Chicken Essence Improves Exercise Performance and Ameliorates Physical Fatigue", Journal, 2014, 2681-2696, vol. 6, Nutrients.
Yajun Chen, "Evaluation of Lactic Acid Bacteria with Anti-Fatigue Effects", Hans Journal of Food and Nutrition Science, vol. 11, No. 4, p. 322-331, Nov. 15, 2022.
Yang-Shih Tzu, "A Screening of Complex Probiotics for Reducing Aspirin-Induced Gastric Injury in Mice", Journal, 2022, 27-35, vol. 11, No. 1, Hans Journal of Food and Nutrition Science.
Ruokun Yi, "The Effect of Lactobacillus Plantarum CQPC02 of Fatigue and Biochemical Oxidation Levels in a Mouse Model of Physical Exhaustion", Article, 2021, 1-9, vol. 8, Frontiers in Nutrition.
Qiuping Chen et al., "Effect of Lactobacillus plantarum KSFY01 on the exercise capacity of D-galactose-induced oxidative stress-aged mice," Frontiters in Microbiology, vol. 13, No. 1030833, p. 1-13, Dec. 22, 2022.

(Continued)

*Primary Examiner* — Louise W Humphrey
*Assistant Examiner* — Rachel Emily Martin
(74) *Attorney, Agent, or Firm* — Hayes Soloway PC

(57) ABSTRACT

The present disclosure relates to an anti-fatigue *Lactobacillus* composition. The anti-fatigue *Lactobacillus* composition, which includes at least one of *Lactobacillus brevis* GKEX, *Lactobacillus plantarum* GKK1 and *Lactobacillus johnsonii* GKJ2 as an active ingredient, administered to a healthy subject for a continuous period of time, can significantly improve fatigue-related biochemical indices and prolong aerobic exercise time to exhaustion, and thus can be used as an active ingredient for preparation of various compositions for anti-fatigue and/or improving athletic ability.

12 Claims, 3 Drawing Sheets
Specification includes a Sequence Listing.

(56) References Cited

OTHER PUBLICATIONS

Mon-Chien Lee et al., "Supplementation with Lactiplantibacillus brevis GKEX Combined with Resistance Exercise Training Improves Muscle Mass, Strength Performance, and Body Fat Condition in Healthy Humans," Foods, vol. 13, No. 1030, p. 1-18, Mar. 27, 2024.

Yi-Jin Lin et al., "In Vivo Screening of Probiotic Strains with Anti-fatigue Properties," 2022 Annual Conference and Symposium, Dec. 23, 2022.

* cited by examiner

ANTI-FATIGUE *LACTOBACILLUS* COMPOSITION AND METHOD OF PROMOTING ANTI-FATIGUE PERFORMANCE AFTER AEROBIC EXERCISE OF SUBJECT IN NEED THEREOF BY USING THE SAME

CROSS-REFERENCE TO RELATED APPLICATION

This application is a Divisional Application of the U.S. application Ser. No. 18/450,812, filed Aug. 16, 2023, which claims priority to Taiwan Application Serial Number 112113702, filed Apr. 12, 2023, all of which is herein incorporated by reference.

REFERENCE TO A SEQUENCE LISTING

A sequence listing is being submitted herein as xml format with the name "SP-6001-1-US_SEQ_LIST", created on Jun. 11, 2024, with a file size of 7,080 bytes.

BACKGROUND

Field of Invention

The present disclosure relates to a probiotic composition and a use thereof, in particular to an anti-fatigue *Lactobacillus* composition and a method of promoting anti-fatigue performance after aerobic exercise of a subject in need thereof by using the same.

Description of Related Art

Most of our lives today are so busy and increasingly stressful in competition. Various pressures often result in fatigue or overwork of people and put adverse effect on people's health. Fatigue caused by overwork is accompanied by decline in physiological functions, resulting in decrease in physical strength and athletic ability.

Fatigue is divided into mental fatigue and physical fatigue, in which physical fatigue refers to a condition in which body cannot function normally on a certain standard, resulting in a decline in physical strength and athletic ability. When physical fatigue continuously occurs, human body keeps in a state of fatigue. If someone under excessive stress or overwork for a long time, the body cannot get enough rest. When fatigue cannot be relieved by rest, and affects daily life and reduces activities by more than or equal to 50%, it may cause chronic fatigue syndrome (CFS) including muscle aches, generalized muscle weakness, generalized headaches, sleep disorders, mental or neurological symptoms and so on, leading in adverse effect on work and daily life.

Probiotics are generally defined as bacteria that are beneficial to human health and can multiply in the human intestinal tract and are nonpathogenic. In general, the probiotics can regulate physique and change some metabolic pathways of the human body, so as to achieve effects of improving the overall gastrointestinal tract and metabolic capacity. The most commonly used genera of probiotics are *Lactobacillus*. Previous studies have shown that the *Lactobacillus* can improve obesity and enhance immunity, and specific *Lactobacillus* strains have effects of significantly antioxidant activity, as well as facilitating maintenance of intestinal permeability and inhibiting growth of gas-producing bacteria in the intestine, etc.

However, there are relatively few studies on anti-fatigue function and improvement of exercise performance of the *Lactobacillus*, and there is an urgent need to develop an anti-fatigue *Lactobacillus* composition and a use thereof.

SUMMARY

Therefore, one aspect of the present disclosure is to provide an anti-fatigue *Lactobacillus* composition, which includes at least one of *Lactobacillus brevis* strain GKEX, *Lactobacillus plantarum* strain GKK1 and *Lactobacillus johnsonii* strain GKJ2.

Moreover, another aspect of the present disclosure is to provide an anti-fatigue *Lactobacillus* composition, which includes the above-mentioned *Lactobacillus* strain(s) as an active ingredient, and the anti-fatigue *Lactobacillus* composition with an effective dose of the *Lactobacillus* is administered orally to a healthy subject for at least four consecutive weeks, thereby improving fatigue-related biochemical indices and prolonging aerobic exercise time to exhaustion.

Furthermore, a still another aspect of the present disclosure is to provide a method of improving athletic ability of a subject in need thereof, which includes administering orally an anti-fatigue *Lactobacillus* composition to a healthy subject for at least four consecutive weeks.

According to the above aspect of the present disclosure, an anti-fatigue *Lactobacillus* composition is provided. In one embodiment, the anti-fatigue *Lactobacillus* composition includes at least one of *Lactobacillus brevis* strain GKEX, *Lactobacillus plantarum* strain GKK1 and *Lactobacillus johnsonii* strain GKJ2. The *Lactobacillus brevis* strain GKEX was deposited at International Patent Organisms Depositary (IPOD), National Institute of Technology and Evaluation (NITE) (Room 122, 2-5-8 Kazusakamatari, Kisarazu-shi, Chiba, 292-0818, Japan), which is an international depositary authority under the terms of the Budapest Treaty, on Aug. 5, 2022, under International Accession Number NITE BP-03696. The *Lactobacillus plantarum* strain GKK1 was deposited at NITE-IPOD on Aug. 5, 2022, under International Accession Number NITE BP-03702. The *Lactobacillus johnsonii* strain GKJ2 was deposited at NITE-IPOD on Nov. 6, 2020, under International Accession Number NITE BP-03315.

In the foregoing embodiments, the anti-fatigue *Lactobacillus* composition can be, for example, an oral composition, such as a pharmaceutical composition or a food composition. In the foregoing examples, the anti-fatigue *Lactobacillus* composition further includes a pharmaceutically and food-acceptable carrier, excipient and/or additive.

In the foregoing embodiments, a dosage form of the anti-fatigue *Lactobacillus* composition can include, for example, powder, tablet, granule, microcapsule, ampoule or liquid spray.

In the foregoing embodiments, the anti-fatigue *Lactobacillus* composition has anti-fatigue ability and/or improvement of athletic ability, which includes prolonging swimming time to exhaustion, prolonging running time to exhaustion, reducing an elevated ratio of serum lactate and serum urea nitrogen concentration and/or increasing a glycogen content in liver after aerobic exercise.

According to the another aspect of the present disclosure, an anti-fatigue *Lactobacillus* composition is provided, which includes the *Lactobacillus* as an active ingredient, in which the *Lactobacillus* includes at least one of *Lactobacillus brevis* strain GKEX (NITE BP-03696), *Lactobacillus plantarum* strain GKK1 (NITE BP-03702) and *Lactobacillus johnsonii* strain GKJ2 (NITE BP-03315), and the anti-fatigue *Lactobacillus* composition with an effective dose of the *Lactobacillus* is administered orally to a healthy subject for at least four consecutive weeks.

In the foregoing embodiments, the healthy subject can be, for example, an adult, and the effective dose of the *Lactobacillus* administered to the subject can be, for example, 50 mg/60 kg body weight/day to 1,900 mg/60 kg body weight/day.

In the foregoing embodiments, the healthy subject is a mouse, and the effective dose of the *Lactobacillus* administered to the subject can be, for example, 10.5 mg/kg body weight/day to 400 mg/kg body weight/day.

According to the still another aspect of the present disclosure, a method of improving athletic ability of a subject in need thereof is provided, which includes administering orally an anti-fatigue *Lactobacillus* composition to a healthy subject for at least four consecutive weeks. In an embodiment, the *Lactobacillus* comprises at least one of *Lactobacillus brevis* strain GKEX (NITE BP-03696), *Lactobacillus plantarum* strain GKK1 (NITE BP-03702) and *Lactobacillus johnsonii* strain GKJ2 (NITE BP-03315).

The above-mentioned anti-fatigue *Lactobacillus* composition of the present disclosure, which includes at least one of the *Lactobacillus brevis* strain GKEX, the *Lactobacillus plantarum* strain GKK1 and the *Lactobacillus johnsonii* strain GKJ2, administered to a healthy subject for a continuous period of time, can significantly improve fatigue-related biochemical indices and prolong aerobic exercise time to exhaustion, and thus can be used as an active ingredient for preparation of various compositions for anti-fatigue and/or improving athletic ability.

It can be understood that the foregoing general description and the following detailed description are only examples, and are intended to provide further explanations to the claimed invention.

BRIEF DESCRIPTION OF THE DRAWINGS

In order to allow the above-mentioned and other objects, features, advantages and embodiments of the present disclosure to be more clearly understood, the detailed description of the accompanying drawings is as follows.

DETAILED DESCRIPTION

Figure 1:
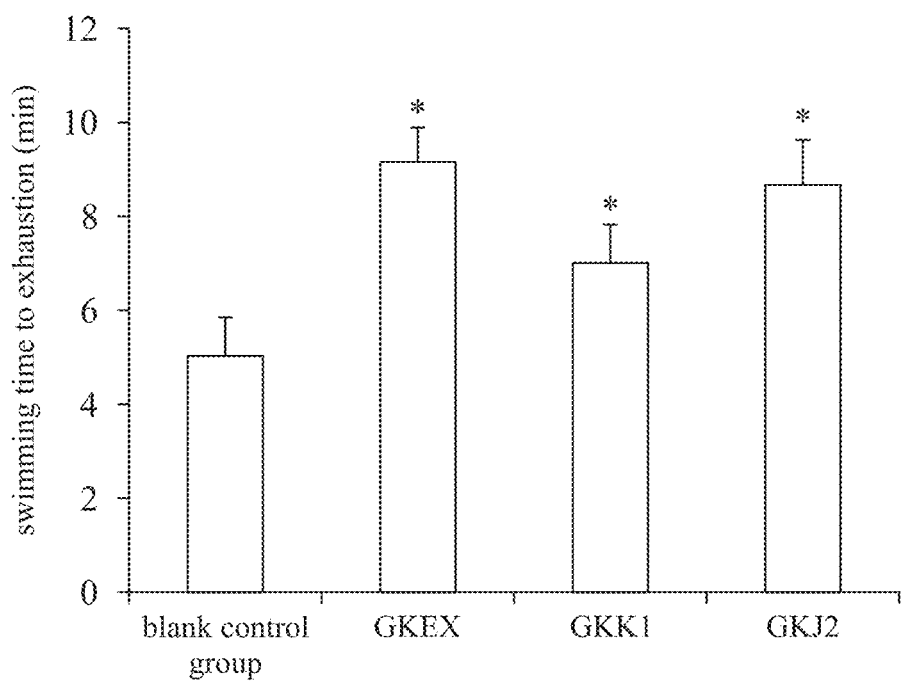
FIG. 1 is a bar graph showing weight-bearing swimming times to exhaustion of mice in a blank control group and experimental groups according to an embodiment of the present disclosure.

If the definition or usage of a term in the cited document is inconsistent with or contrary to the definition of the term here, the definition of the term here applies instead of the definition of the term in the cited document. Secondly, unless otherwise defined by context, the singular term can include plural, and the plural term can include singular.

As mentioned above, the present disclosure provides an anti-fatigue *Lactobacillus* composition and a use thereof, which after being administered to a healthy subject for a continuous period of time, it can effectively reduce serum lactate after aerobic exercise, and reduce serum urea nitrogen after aerobic exercise, and increase a glycogen content in liver, and increase a glycogen content in muscle, and/or reduce visceral fat.

In one embodiment, the "*Lactobacillus*" referred to herein can refer to strains including different species of a same genus, for example, including at least one of *Lactobacillus brevis* strain GKEX, *Lactobacillus plantarum* strain GKK1 and *Lactobacillus johnsonii* strain GKJ2. In a specific example, the *Lactobacillus brevis* strain GKEX was deposited at and publicly available from International Patent Organisms Depositary (IPOD), National Institute of Technology and Evaluation (NITE)(Room 122, 2-5-8 Kazusakamatari, Kisarazu-shi, Chiba, 292-0818, Japan), which is an international depositary authority under the terms of the Budapest Treaty, on Aug. 5, 2022, under International Accession Number NITE BP-03696. The *Lactobacillus plantarum* strain GKK1 was deposited at and publicly available from NITE-IPOD on Aug. 5, 2022, under International Accession Number NITE BP-03702. The *Lactobacillus johnsonii* strain GKJ2 was deposited at and publicly available from NITE-IPOD on Nov. 6, 2020, under International Accession Number NITE BP-03315. It is supplemented that the present disclosure needs to select specific strains of the *Lactobacillus*, so that the obtained *Lactobacillus* composition can exert effects such as improving anti-fatigue and/or improving athletic ability of healthy subjects. If the *Lactobacillus* is not selected from the above-mentioned specific strains, or the strains are increased or decreased, or part or all of the strains can be replaced by other strains of the same species, it cannot be expected to obtain the effect of improving anti-fatigue and/or improving athletic ability of healthy subjects.

The *Lactobacillus* composition has anti-fatigue ability and/or improvement of athletic ability. Generally, evaluation items of the "anti-fatigue ability" referred to here can include, but not limited to, reduction of an elevated ratio of serum lactate and a serum urea nitrogen concentration and/or increase of a glycogen content in liver after aerobic exercise, while evaluation items of the "improvement of athletic ability" referred to here can include, but not limited to, prolongation of aerobic exercise time to exhaustion. In one embodiment, administering an oral composition containing an effective dose of the *Lactobacillus* to a healthy subject for at least four consecutive weeks can effectively improve fatigue-related biochemical indices (e.g., reducing the elevated ratio of the serum lactate and the serum urea nitrogen concentration and increasing the glycogen content in liver after aerobic exercise) and significantly prolong the aerobic exercise time to exhaustion (e.g., prolonging swimming time to exhaustion, prolonging running time to exhaustion).

In one embodiment, a content of each of the strains of the *Lactobacillus* is not particularly limited. In one example, a weight (mg) ratio or a ratio of colony forming units (CFU) of the *Lactobacillus brevis* strain GKEX (NITE BP-03696), the *Lactobacillus plantarum* strain GKK1 (NITE BP-03702) and the *Lactobacillus johnsonii* strain GKJ2 (NITE BP-03315) can be, for example, 1:1:1, however, in other examples, the weight (mg) ratio of *Lactobacillus brevis* strain GKEX (NITE BP-03696), the *Lactobacillus plantarum* strain GKK1 (NITE BP-03702) and the *Lactobacillus johnsonii* strain GKJ2 (NITE BP-03315) can be other than 1:1:1, such as 1:1:(>1~10).

When applied, the *Lactobacillus* composition can be, for example, an oral composition, such as a pharmaceutical composition or a food composition. A usage of the *Lactobacillus* can include, but not limited to, whole fermented liquid, sludge (or called cell pellet), supernatant, and lyophilized powder. In the above-mentioned embodiments, the aforementioned whole fermented liquid refers to a product including bacteria and culture liquid. The aforementioned sludge refers to a product after removing the supernatant from the whole fermented liquid. The aforementioned supernatant refers to a product after removing the sludge from the whole fermented liquid. The above-mentioned lyophilized powder refers to preparation from the whole fermented liquid, sludge and/or supernatant, and still contains other inseparable components.

Examples of the aforementioned pharmaceutical compositions can include, but are not limited to, pharmaceuticals. Examples of the *Lactobacillus* applied to the food compositions can include, but are not limited to, general foods, health foods, beverages, nutritional supplements, dairy or feed, etc. In the examples of the aforementioned oral compositions, the *Lactobacillus* composition can optionally include a pharmaceutically and food-acceptable carrier, excipient and/or additive. In other examples, a dosage form of the *Lactobacillus* composition can include, but not limited to, powder, tablet, granule, microcapsule, ampoule or liquid spray.

When the above-mentioned *Lactobacillus* is used as a composition for improving athletic ability of a subject in need thereof, the anti-fatigue *Lactobacillus* composition containing the effective dose of the *Lactobacillus* can be administered orally to a healthy subject for a continuous period of time. In one embodiment, the healthy subject is not particularly limited, and can be, for example, a healthy subject. In this embodiment, the effective dose depends on the subject and is not particularly limited. For example, when the subject is an adult, the effective dose of *Lactobacillus* for the adult can be, for example, 50 mg/60 kg body weight/day to 1,900 mg/60 kg body weight/day, preferably 100 mg/60 kg body weight/day to 1,800 mg/60 kg body weight/day, and more preferably about 100 mg/60 kg body weight/day to about 1,000 mg/60 kg body weight/day. In another example, when the subject is a mouse, the effective dose of the *Lactobacillus* for the subject can be, for example, 10.5 mg/kg body weight/day to 400 mg/kg body weight/day, preferably 15.75 mg/kg body weight/day to 300 mg/kg body weight/day, and more preferably about 21 mg/kg body weight/day to about 205 mg/kg body weight/day. In other examples, the aforementioned period of administration can be, for example, at least four consecutive weeks, or can be longer or shorter.

It should be understood that the following specific strains, specific formulations, specific dosages, specific detection methods, viewpoints, illustrations and embodiments are for illustration only, and not as limitations of the present disclosure. The principal features of the present disclosure can be employed in various embodiments without departing from the spirit and scope of the present disclosure. Therefore, those skilled in the art of the present disclosure can easily determine the essential technical features of the present disclosure, and make various changes and modifications to the present disclosure to apply to different purposes and conditions without departing from the spirit and scope of the present disclosure.

Embodiment 1

1.1 Source of Strain

The strains used in this embodiment included a specific combination of probiotics, which included the *Lactobacillus brevis* strain GKEX, the *Lactobacillus plantarum* strain GKK1 and the *Lactobacillus johnsonii* strain GKJ2. The *Lactobacillus brevis* strain GKEX was deposited at International Patent Organisms Depositary (IPOD), National Institute of Technology and Evaluation (NITE)(Room 122, 2-5-8 Kazusakamatari, Kisarazu-shi, Chiba, 292-0818, Japan), which is an international depositary authority under the terms of the Budapest Treaty, on Aug. 5, 2022, under International Accession Number NITE BP-03696. The *Lactobacillus plantarum* strain GKK1 was deposited at NITE-IPOD on Aug. 5, 2022, under International Accession Number NITE BP-03702. The *Lactobacillus johnsonii* strain GKJ2 was deposited at NITE-IPOD on Nov. 6, 2020, under International Accession Number NITE BP-03315.

The bacterial strain GKEX, bacterial strain GKK1 and bacterial strain GKJ2 were all isolated from human body or plant. For example, the strain GKEX was isolated from organic vegetable and fruit fermented liquid, and the strain GKK1 was isolated from sour chili, and the strain GKJ2 was isolated from mother's milk.

In some examples, the *Lactobacillus brevis* strain GKEX, the *Lactobacillus plantarum* strain GKK1 and the *Lactobacillus johnsonii* strain GKJ2 were respectively inoculated on solid media to activate the strains. In a specific example, the above-mentioned solid medium was commercially available MRS (deMan, Rogosa and Sharpe) agar or RCM (reinforced clostridial medium) agar. After the colony was formed, a single colony was picked out and inoculated into a liquid medium for liquid culture. In a specific example, the bacterial strain was cultivated at temperature of 25° C. to 40° C. In a specific example, time for liquid culture was 16 to 24 hours. In a specific example, the liquid medium was MRS liquid medium or RCM liquid medium. After the liquid culture was completed, fermentation culture was carried out. In a specific example, a formulation of the fermentation medium is listed in Table 1 below.

TABLE 1

| Formulation of fermentation medium | |
|---|---|
| component | content (weight percentage, wt %) |
| sugar | 1~10 |
| yeast extract | 0.1~5 |
| protein peptone | 0.1~5 |
| trace elements | 0.01~2 |
| cysteine | 0.01~0.1 |
| Tween-80 | 0.05~1 |

1.2 Preparation of Lyophilized Powder

After the *Lactobacillus* strain GKEX, the *Lactobacillus plantarum* strain GKK1 and the *Lactobacillus johnsonii* strain GKJ2 had been fermented and grown, respectively, whole fermented liquid containing bacteria and culture liquid was collected and centrifuged with a speed of 1,000 rpm to 15,000 rpm to obtain sludge. The obtained sludge was mixed with a protective agent (i.e., 6 wt % to 50 wt % of skimmed milk powder) and then lyophilized. The aforementioned lyophilization was performed by pre-freezing in a gradient setting mode, and it was stored at 20° C. to 0° C. for 1 to 4 hours, then stored at 0° C. to −20° C. for 4 to 8 hours, and then stored at −196° C. to −30° C. for more than 8 hours. In a preferred embodiment, the lyophilization was performed by storing at −40° C. for 2 hours, then storing at −20° C. for 2 hours, then storing at 0° C. for 2 hours, and finally storing at 20° C. for about 10 hours or more. Afterwards, the obtained lyophilized powder was stored at low temperature. In another preferred specific example, the stored low temperature was −30° C. to 4° C. The preserved lyophilized powder contained other inseparable components and could be used as a raw material of the *Lactobacillus* composition to be administered to experimental animals in following animal experiments.

1.3 Experimental Animals 6-week-old male ICR mice with an average body weight of about 30 grams were selected and used in following examples, which were purchased from BioLASCO Co., Ltd. All animal experimental procedures were reviewed and approved by Institutional Animal Care and Use Committee (IACUC) of National Taiwan Sport University. The mice were kept in a standard breeding cage, and average temperature of the mouse room was about 22±2° C., and average humidity was 65±5%. The light and darkness were regularly 12 hours, and daily temperature and humidity values were recorded. Food and water were given ad libitum. After two weeks of pre-breeding to adapt to environment, the experimental animals were divided into 4 groups according to their body weights in an S-shaped arrangement, which included a blank control (vehicle) group and three experimental groups (i.e., a GKEX group, a GKK1 group and a GKJ2 group), and there were 6 mice in each group.

The mice were subjected to animal experiments for four weeks, during which they were fed with the *Lactobacillus* by tube feeding every day. After continuous administration of four weeks (equivalent to day 1 to day 28 of the test), analysis of biochemical indices related to various athletic abilities and fatigue were carried out sequentially. During the experiments, the body weight, feed intake and drinking water were recorded.

1.4 Experimental Design

The test animals were orally administered with sterilized water (the blank control group) or the *Lactobacillus* of Embodiment 1 (the experimental groups) every day for four consecutive weeks (i.e., 28 days). Effective dosages of the *Lactobacillus* administered to the mice in the experimental groups were as follows. The dosage of the *Lactobacillus brevis* strain GKEX was 21 mg/kg body weight/day. The dosage of the *Lactobacillus plantarum* strain GKK1 was 21 mg/kg body weight/day. The dosage of the *Lactobacillus johnsoni* strain GKJ2 was 205 mg/kg body weight/day (equivalent to the dosage of GKEX of 100 mg/60 kg body weight/day, the dosage of GKK1 of 100 mg/60 kg body weight/day, and the dosage of GKJ2 of 1,000 mg/60 kg body weight/day). After four weeks of intake, following analyzes were performed: weight-bearing swimming time to exhaustion (equivalent to exercise endurance, unit: minute), weight-bearing running time to exhaustion (equivalent to exercise endurance, unit: minute), various blood biochemical indices before and after exercise [including: content of serum lactate (unit: mmol/L), serum urea nitrogen content (unit: mg/dL), glycogen contents in liver and muscle (mg/g liver or mg/g muscle)].

1.5 Statistics

Numerical values described herein are represented by mean±standard deviation (mean±SD), and analyzed using one-way ANOVA and commercially available software, with $p<0.05$ to judge that there was statistical significance difference, in which  represents $p<0.05$, and * represents $p<0.005$.

Embodiment 2. Evaluation of *Lactobacillus* of Embodiment 1 in Enhancing Anti-Fatigue Effect 2.1 Evaluation of Exercise Endurance-Weight-Bearing Swimming Time to Exhaustion The animals were allowed to adapt to swimming one week before the test (conditions: a diameter was 28 cm, and a water depth was 25 cm, and water temperature was 27±1° C.). After four weeks of the test, on day 31 of the test, a load (5% of the mouse's body weight, for example, a lead sheet with 5% of the mouse's body weight was fixed to base of the mouse's tail) was used to make the mice undergo the test of weight-bearing swimming exhaustion. One week before the test of weight-bearing swimming exhaustion, the animals were allowed to adapt to swimming in the environment with the diameter of 28 cm, the water depth of 25 cm, and the water temperature of 27±1° C. Fasting for 12 hours before swimming, and the test was carried out in a single swimming mode 30 minutes after feeding and administering the *Lactobacillus*. The mouse was put into a water tank and the test animal was forced to swim. During the test, the water temperature was controlled at 27±1° C. In addition, mouse limbs were kept in motion throughout the experiment. If the mouse was floating on water without moving the limbs, a stir bar was used to stir near the mouse. The performance of exercise endurance (weight-bearing swimming to exhaustion) was shown by recording the time until the mouse's head was completely submerged in water for 8 seconds and did not surface. The results are shown in FIG. 1.

Please refer to FIG. 1, which is a bar graph showing weight-bearing swimming times (minute) to exhaustion of mice in a blank control group and experimental groups according to an embodiment of the present disclosure.

As shown in FIG. 1, the weight-bearing swimming time to exhaustion of the blank control group (vehicle) was 5.02±0.83 minutes, and the weight-bearing swimming time to exhaustion of the GKEX group was 9.15±0.73 minutes, and the weight-bearing swimming time to exhaustion of the GKK1 group was 7.01±0.8 minutes, and the weight-bearing swimming time to exhaustion of the GKJ2 group was 8.68±0.94 minutes. The statistical analysis results showed that the swimming times to exhaustion of the GKEX group, GKK1 group and GKJ2 group were significantly increased by 1.82 times (p=0.0059), 1.40 times (p=0.0006) and 1.73 times (p<0.0001), respectively, compared with that of the blank control group (vehicle). Therefore, it confirmed that the probiotic strains GKEX, GKK1 and GKJ2 of the present disclosure administered to mice for four consecutive weeks could significantly prolong the swimming time to exhaustion.

2.2 Evaluation Exercise Endurance-Treadmill Time to Exhaustion

After four weeks of the test, a test of running exhaustion was adopted on day 33, and fasting was performed for 12 hours before running. During the test, each mouse was on a track, and an electric shock zone was set at the end of the track to force the test animal to run. Conditions of a treadmill referred to a known method, and an initial speed was 10 m/min, and a slope was 5%. After 5 minutes, the speed was increased by 2 m/min per minute until the mouse fell into the electric shock zone several times or could not continue to move forward in the electric shock zone for more than 5 seconds, and it was judged as exhaustion, and the time from start running to exhaustion was recorded, and the results are shown in FIG. 2.

Figure 2:
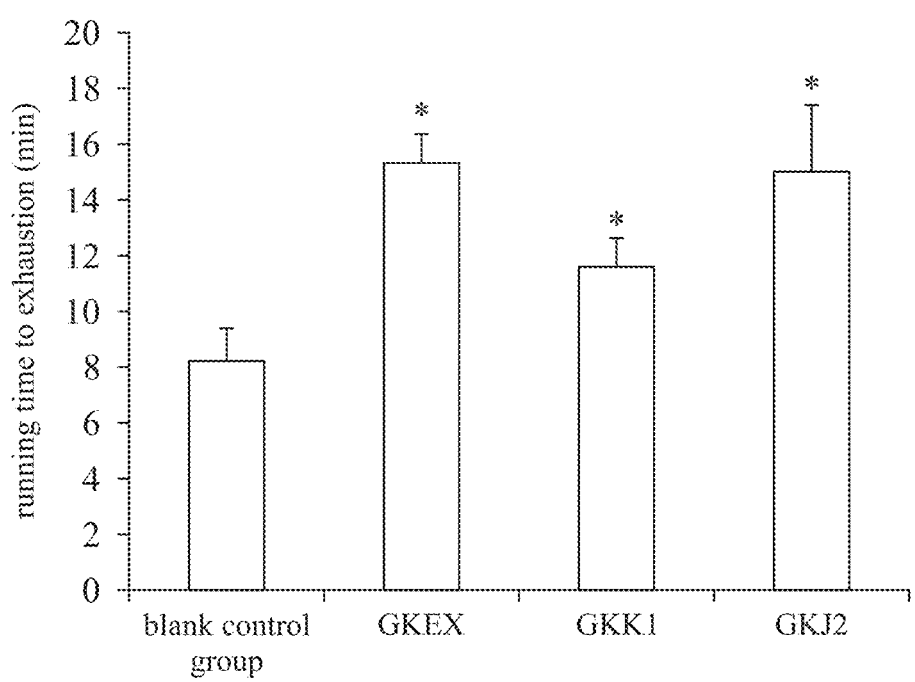
FIG. 2 is a bar graph showing weight-bearing running times to exhaustion of mice in a blank control group and experimental groups according to an embodiment of the present disclosure.

Please refer to FIG. 2, which is a bar graph showing weight-bearing running times (minute) to exhaustion of mice in a blank control group and experimental groups according to an embodiment of the present disclosure.

As shown in FIG. 2, the running time to exhaustion of the blank control group (vehicle) was 8.25±1.14 minutes, and the running time to exhaustion of the GKEX group was 15.32±1.02 minutes, and the running time to exhaustion of the GKK1 group was 11.63±0.97 minutes, and the running time to exhaustion of the GKJ2 group was 15.04±2.36 minutes. The statistical analysis results showed that the running times to exhaustion of the GKEX group, GKK1 group and GKJ2 group were significantly increased by 1.86 times ($p<0.0001$), 1.41 times ($p=0.0001$) and 1.82 times ($p<0.0001$), respectively, compared with that of the blank control group (vehicle). Therefore, it confirmed that the probiotic strains GKEX, GKK1 and GKJ2 of the present disclosure administered to mice for four consecutive weeks could significantly prolong the running time to exhaustion.

2.3 Evaluation of Fatigue-Related Biochemical Indices after Exercise

Figure 3:
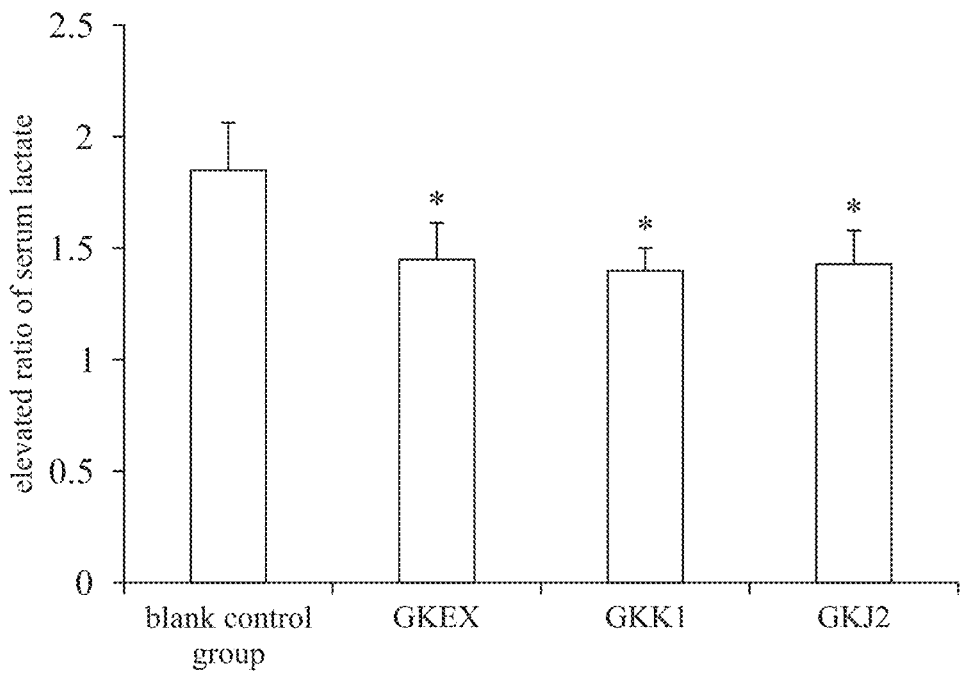
FIG. 3 is a bar graph showing elevated ratios of blood lactate of mice in a blank control group and experimental groups after exercise according to an embodiment of the present disclosure.

In order to evaluate the effect of the *Lactobacillus* on blood biochemical indices after exercise and fatigue, a blood lactate concentration change of mice before and after exercise was detected according to the "anti-fatigue function evaluation method of healthy food", and an elevated ratio of the blood lactate after exercise was calculated, and the results are shown in FIG. 3.

Please refer to FIG. 3, which is a bar graph showing elevated ratios of blood lactate of mice in a blank control group and experimental groups after exercise according to an embodiment of the present disclosure.

As shown in FIG. 3, the elevated ratios of the blank control group (vehicle), GKEX group, GKK1 group, and GKJ2 group were 1.85±0.21, 1.45±0.16, 1.46±0.10 and 1.43±0.15, respectively. The statistical analysis results showed that the elevated ratios of lactate of the GKEX group, GKK1 group and GKJ2 group were significantly reduced by 21.9% ($p=0.0006$), 21.1% ($p=0.0009$) and 22.9% ($p=0.0003$), respectively, compared with that of the blank control group (vehicle). Therefore, it confirmed that the probiotic strains GKEX, GKK1 and GKJ2 of the present disclosure administered to mice for four consecutive weeks could significantly reduce the elevated ratio of lactate.

Secondly, in order to evaluate the effect of the *Lactobacillus* on a fatigue-related blood urea nitrogen (BUN) content, on the day of the test (day 35 of the test), after feeding the *Lactobacillus* for 30 minutes, swimming without weight-bearing in water for 90 minutes and resting for 60 minutes, 0.2 mL of blood was collected at three time points for BUN analysis. The results are shown in FIG. 4.

Figure 4:
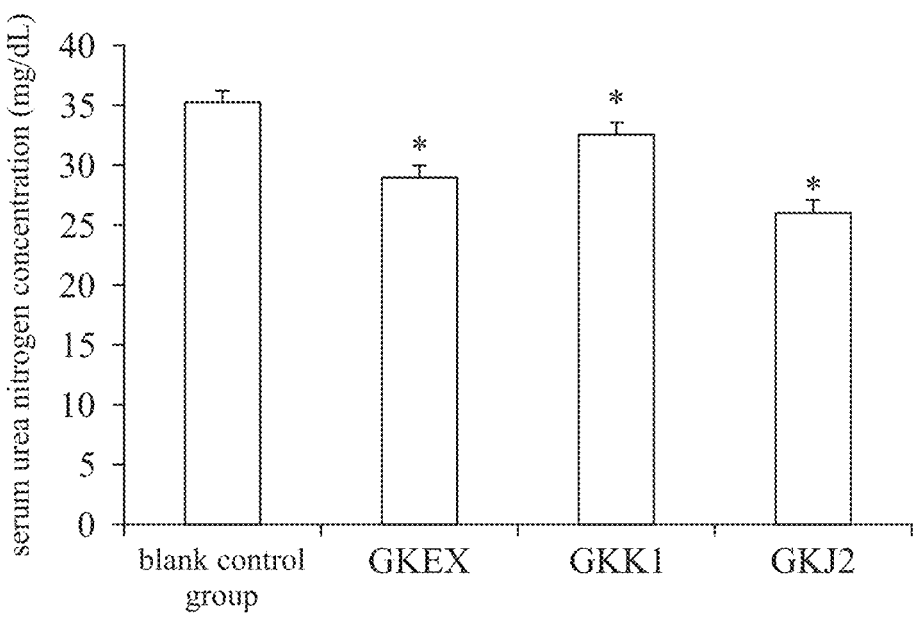
FIG. 4 is a bar graph showing blood urea nitrogen concentrations of mice in a blank control group and experimental groups after exercise according to an embodiment of the present disclosure.

Please refer to FIG. 4, which is a bar graph showing blood urea nitrogen concentrations of mice in a blank control group and experimental groups after exercise according to an embodiment of the present disclosure.

As shown in FIG. 4, the blood urea nitrogen concentrations of the blank control group (vehicle), GKEX group, GKK1 group, and GKJ2 group were 35.23±2.62 mg/dL, 28.98±1.42 mg/dL, 32.57±1.22 mg/dL and 26.05±2.69 mg/dL, respectively. The statistical analysis results showed that the blood urea nitrogen concentrations of the GKEX group, GKK1 group and GKJ2 group were significantly reduced by 17.7% ($p<0.0001$), 7.57% ($p=0.0064$) and 26.06% ($p<0.0001$), respectively, compared with that of the blank control group (vehicle). Therefore, it confirmed that the probiotic strains GKEX, GKK1 and GKJ2 of the present disclosure administered to mice for four consecutive weeks could significantly reduce the blood urea nitrogen concentration.

2.4 Evaluation of Glycogen Content in Liver

In order to evaluate the effect of the *Lactobacillus* on a glycogen content in liver, after the 90-minute swimming test, all animals were allowed to rest for 2 days (day 39 of the test), and all animals were sacrificed 30 minutes after the last feeding. In addition, mice livers were collected and washed with normal saline, then dried and weighed. Tissues were cut at the same position and aliquoted and frozen at −80° C. for subsequent analysis of the glycogen contents in the tissues.

In this embodiment, glycogen was directly quantified according to a conventional chemical analysis method. Briefly, firstly, the tissue sample to be tested was taken out, and 5 times the volume (w/v) of tissue homogenate was added, and different tissues were homogenized using Bullet Blender (Next Advance, Cambridge, MA, USA). Next, the tissue homogenate was divided into microcentrifuge tubes, and centrifuged at 4° C. and 12,000×g for 15 minutes, and an upper layer of extract was taken out, and the glycogen content was directly analyzed. The analysis method was referred to Huang et al., Chicken essence improves exercise performance and ameliorates physical fatigue, Nutrients 6(7): 2681-2696 (2014), which was incorporated herein by reference. 30 μl of supernatant was taken and added into a 96-well plate and mixed with 200 μl of iodine-potassium iodide reagent to make iodine and glycogen combine for 10 minutes to turn brown, and ELISA (Tecan Infinite M200, Tecan Austria, Salzburg, Austria) was used to detect an absorbance value at 460 nm of wavelength. In addition, a commercially available glycogen (Sigma) standard product was used to establish a calibration line, so as to calculate changes in glycogen storage in liver of different groups of animals. The relevant results were shown in FIG. 5.

Figure 5:
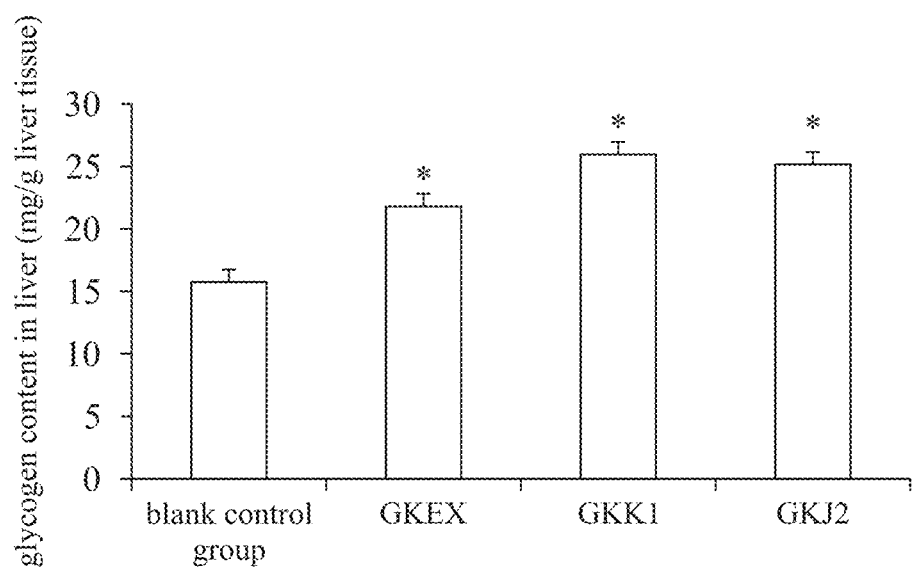
FIG. 5 is a bar graph showing glycogen contents in livers (mg/g liver tissue) of mice in a blank control group and experimental groups according to an embodiment of the present disclosure.

Please refer to FIG. 5, which is a bar graph showing glycogen contents in livers (mg/g liver tissue) of mice in a blank control group and experimental groups according to an embodiment of the present disclosure.

As shown in FIG. 5, the glycogen contents in livers of the blank control group (vehicle), GKEX group, GKK1 group, and GKJ2 group were 15.75±2.81 mg/g liver tissue, 21.82±1.19 mg/g liver tissue, 25.98±3.00 mg/g liver tissue and 25.16±1.71 mg/g liver tissue, respectively. The statistical analysis results showed that the glycogen contents in livers of the GKEX group, GKK1 group and GKJ2 group were significantly increased by 1.51 times ($p=0.0005$), 1.65 times ($p<0.0001$) and 1.60 times ($p<0.0001$), respectively, compared with that of the blank control group (vehicle). Therefore, it confirmed that the probiotic strains GKEX, GKK1 and GKJ2 of the present disclosure administered to mice for four consecutive weeks could significantly increase the glycogen content in liver.

In summary, in the present disclosure, specific bacterial strains, specific formulations, specific dosages, specific detection methods, or specific evaluation methods are only used to illustrate the anti-fatigue *Lactobacillus* composition and the use thereof. However, those skilled in the art of the present disclosure should understand that without departing from the spirit and scope of the present disclosure, two or three of the *Lactobacillus brevis* strain GKEX, the *Lactobacillus plantarum* strain GKK1 and the *Lactobacillus johnsonii* strain GKJ2, other formulations, other dosages, other detection methods, or other evaluation methods can also be used for the anti-fatigue *Lactobacillus* composition and the use thereof, and are not limited to the above. For example, the *Lactobacillus* composition can be the pharmaceutical composition or the food composition, which can optionally include the pharmaceutically and food-acceptable carrier, excipient and/or additive, and can be made into powder, tablet, granule, microcapsule, ampoule, liquid spray and other dosage forms.

According to the foregoing embodiment, the anti-fatigue *Lactobacillus* composition of the present disclosure has advantages that the *Lactobacillus* composition, which includes at least one of the *Lactobacillus brevis* strain GKEX, the *Lactobacillus plantarum* strain GKK1 and the *Lactobacillus johnsonii* strain GKJ2, administered to the healthy subject for the continuous period of time can significantly improve the fatigue-related biochemical indices and prolong the aerobic exercise time to exhaustion, and thus can be used as the active ingredient for preparation of various compositions for anti-fatigue and/or improving athletic ability.

While the present disclosure has been disclosed above with several specific embodiments, other embodiments are possible. Therefore, the spirit and scope of the appended claims of the present disclosure should not be limited to the description of the embodiments contained herein.

What is claimed is:

1. A method of promoting anti-fatigue performance after aerobic exercise in a subject in need thereof, comprising:
    orally administering an anti-fatigue *Lactobacillus* composition to a healthy subject for at least four consecutive weeks, wherein the anti-fatigue *Lactobacillus* composition consists of: an effective dose of a *Lactobacillus* species selected from the group consisting of *Lactobacillus brevis* strain GKEX deposited at International Patent Organisms Depositary (IPOD) under International Accession Number NITE BP-03696, *Lactobacillus johnsonii* strain GKJ2 deposited at IPOD under International Accession Number NITE BP-03315, and any combination thereof;
    wherein the anti-fatigue performance comprises; prolonging swimming time to exhaustion, prolonging running time to exhaustion, reducing an elevated ratio of serum lactate, reducing an elevated serum urea nitrogen concentration, and/or increasing liver glycogen content after the aerobic exercise.

2. The method of claim 1, wherein the anti-fatigue *Lactobacillus* composition is a pharmaceutical composition or a food composition.

3. The method of claim 1, wherein a dosage form of the anti-fatigue *Lactobacillus* composition comprises powder, tablet, granule, microcapsule, ampoule or liquid spray.

4. The method of claim 1, wherein the healthy subject is an adult, and the effective dose is 50 mg/60 kg body weight/day to 1,900 mg/60 kg body weight/day.

5. The method of claim 1, wherein the healthy subject is a mouse, and the effective dose is 10.5 mg/kg body weight/day to 400 mg/kg body weight/day.

6. A method of improving athletic performance in a subject in need thereof, comprising:
    orally administering an anti-fatigue *Lactobacillus* composition to a healthy subject for at least four consecutive weeks, wherein the anti-fatigue *Lactobacillus* composition consists of a *Lactobacillus* species selected from the group consisting of: *Lactobacillus brevis* strain GKEX with accession number NITE BP-03696, *Lactobacillus johnsonii* strain GKJ2 with accession number NITE BP-03315, and any combination thereof;
    wherein the athletic performance comprises: prolonging swimming time to exhaustion, prolonging running time to exhaustion, reducing an elevated ratio of serum lactate, reducing an elevated serum urea nitrogen concentration, and/or increasing liver glycogen content after aerobic exercise.

7. The method of claim 6, wherein the anti-fatigue *Lactobacillus* composition is a pharmaceutical composition or a food composition.

8. The method of claim 6, wherein a dosage form of the anti-fatigue *Lactobacillus* composition comprises powder, tablet, granule, microcapsule, ampoule or liquid spray.

9. A method of prolonging running time to exhaustion in a subject in need thereof, comprising:
    orally administering an anti-fatigue *Lactobacillus* composition to a healthy subject for at least four consecutive weeks, wherein the anti-fatigue *Lactobacillus* composition consists of an effective dose of a *Lactobacillus* species selected from the group consisting of: *Lactobacillus brevis* strain GKEX with accession number NITE BP-03696 *Lactobacillus johnsonii* strain GKJ2 with accession number NITE BP-03315, and any combination thereof.

10. The method of claim 9, wherein the anti-fatigue *Lactobacillus* composition is a pharmaceutical composition or a food composition.

11. The method of claim 9, wherein the healthy subject is an adult, and the effective dose is 50 mg/60 kg body weight/day to 1,900 mg/60 kg body weight/day.

12. The method of claim 9, wherein the healthy subject is a mouse, and the effective dose is 10.5 mg/kg body weight/day to 400 mg/kg body weight/day.

* * * * *

```
                        SEQUENCE LISTING

Sequence total quantity: 3
SEQ ID NO: 1            moltype = DNA  length = 1050
FEATURE                 Location/Qualifiers
source                  1..1050
                        mol_type = other DNA
                        organism = Lactobacillus plantarum
SEQUENCE: 1
gggcggggcg gcattctata ctgcagtcga gcgaactctg gtattgattg gtgcttgcat    60
catgatttac atttgagtga gtggcgaact ggtgagtaac acgtgggaaa cctgcccaga   120
agcgggggat aacacctgga aatagatgct aataccgcat aacaacttgg accgcatggt   180
ccgagtttga aagatggctt cggctatcac ttttggatgg tcccgcggcg tattagctag   240
atggtggggt aacggctcac catggcaatg atacgtagcc gacctgagag ggtaatcggc   300
cacattggga ctgagacacg gcccaaactc ctacgggagg cagcagtagg gaatcttcca   360
caatggacga aagtctgatg gagcaacgcc gcgtgagtga agaagggttt cggctcgtaa   420
aactctgttg ttaaagaaga acatatctga gagtaactgt tcaggtattg acggtattta   480
accagaaagc cacggctaac tacgtgccag cagccgcggt aatacgtagg tggcaagcgt   540
tgtccggatt tattgggcgt aaagcgagcg caggcggttt tttaagtctg atgtgaaagc   600
cttcggctca accgaagaag tgcatcggaa actgggaaac ttgagtgcag aagaggacag   660
tggaactcca tgtgtagcgg tgaaatgcgt agatatatgg aagaacacca gtggcgaagg   720
cggctgtctg gtctgtaact gacgctgagg ctcgaaagta tgggtagcaa acaggattag   780
ataccctggt agtccatacc gtaaacgatg aatgctaagt gttggagggt ttccgccctt   840
cagtgctgca gctaacgcat taagcattcc gcctggggag tacggccgca aggctgaaac   900
tcaaaggaat tgacgggggc ccgcacaagc ggtggagcat gtggtttaat tcgaagctac   960
gcgaagaacc ttaccaggtc ttgacatact atgcaaatct agagattaga cgttcccttc  1020
ggggacatgg aaaacagtgc tgcatgatgt                                   1050

SEQ ID NO: 2            moltype = DNA  length = 1050
FEATURE                 Location/Qualifiers
source                  1..1050
                        mol_type = other DNA
                        organism = Lactobacillus brevis
SEQUENCE: 2
cgcatgcgct gtctataatg cagtcgaacg agcttccgtt gaatgacgtg cttgcactga    60
tttcaacaat gaagcgagtg gcgaactggt gagtaacacg tgggaaatct gcccagaagc   120
aggggataac acttggaaac aggtgctaat accgtataac aacaaaatcc gcatggattt   180
tgtttgaaag gtggcttcgg ctatcacttc tggatgatcc cgcggcgtat tagttagttg   240
gtgaggtaaa ggcccaccaa gacgatgata cgtagccgac ctgagagggt aatcggccac   300
attgggactg agacacgcc caaactccta cgggaggcag cagtagggaa tcttccacaa   360
tggacgaaag tctgatggag caatgccgcg tgagtgaaga agggtttcgg ctcgtaaaac   420
tctgttgtta aagaagaaca cctttgagag taactgttca agggttgacg gtatttaacc   480
agaaagccac ggctaactac gtgccagcag ccgcggtaat acgtaggtgg caagcgttgt   540
ccggatttat tgggcgtaaa gcgagcgcag gcggttttt aagtctgata tgaaagcctt   600
cggcttaacc ggagaagtgc atcggaaact gggagacttg agtgcagaag aggacagtgg   660
aactccatgt gtagcggtgg aatgcgtaga tatatggaag aacaccagtg gcgaaggcgg   720
ctgtctagtc tgtaactgac gctgaggctc gaaagcatgg gtagcaaca ggattagata   780
ccctggtagt ccatgccgta aacgatgagt gctaagtgtt ggagggtttc cgcccttcag   840
tgctgcagct aacgcattaa gcactccgcc tggggagtac gaccgcaagg ttgaaactca   900
aggaattgac gggggcccgc acaagcggtg gagcatgtgg tttaattcga ctacgcgag   960
atcttacagt cttgacatct ctgcatccta gagatacgt cccctcggga cagatgacag  1020
tgtgcatgtg tcgtcagctc gtgtcgtgag                                   1050

SEQ ID NO: 3            moltype = DNA  length = 1194
FEATURE                 Location/Qualifiers
source                  1..1194
                        mol_type = other DNA
                        organism = Lactobacillus johnsonii
SEQUENCE: 3
gggaaggggg gtgtgctata catgcaagtc gagcgagctt gcctagatga ttttagtgct    60
tgcactaaat gaaactagat acaagcgagc ggcgacgggt gagtaacac gtgggtaacc   120
tgcccaagag actgggataa cacctggaaa cagatgctaa taccggataa caacactaga   180
cgcatgtcta gagtttgaaa gatggttctg ctatcactct tggatggacc tgcggtgcat   240
```

-continued

```
tagctagttg gtaaggtaac ggcttaccaa ggcaatgatg catagccgag ttgagagact    300
gatcggccac attgggactg agacacggcc caaactccta cgggaggcag cagtagggaa    360
tcttccacaa tggacgaaag tctgatggag caacgccgcg tgagtgaaga agggtttcgg    420
ctcgtaaagc tctgttggta gtgaagaaag atagaggtag taactggcct ttatttgacg    480
gtaattactt agaaagtcac ggctaactac gtgccagcag ccgcggtaat acgtaggtgg    540
caagcgttgt ccggatttat tgggcgtaaa gcgagtgcag gcggttcaat aagtctgatg    600
tgaaagcctt cggctcaacc ggagaattgc atcagaaact gttgaacttg agtgcagaag    660
aggagagtgg aactccatgt gtagcggtgg aatgcgtaga tatatggaag aacaccagtg    720
gcgaaggcgg ctctctggtc tgcaactgac gctgaggctc gaaagcatgg gtagcgaaca    780
ggattagata ccctggtagt ccatgccgta aacgatgagt gctaagtgtt ggGaggtttc    840
cgcctctcag tgctgcagct aacgcattaa gcactccgcc tggggagta cgaccgcaag    900
gttgaaactc aaaggaattg acgggggccc gcacaagcgg tggagcatgt gtttaattcg    960
aagcaacgcg aggaccttac cagtcttgac atccagtgca aacctaggag atagtgttcc   1020
cttcggggac gctgagacag gtggtgcatg gctctattgt tcgtttcgat cgtttttgtga  1080
tcatttttag tgtgatgatt tgtcgtctgg gaatttgcta gaggaatctt gcggccatgc   1140
accttcatgg tgtgtgttgc ttgcaagggc gtatggtgga tgcttttggc acta         1194
```